(12) United States Patent
Baker et al.

(10) Patent No.: US 7,012,216 B2
(45) Date of Patent: Mar. 14, 2006

(54) HAND-HELD LASER WELDING WAND HAVING INTERNAL COOLANT AND GAS DELIVERY CONDUITS

(75) Inventors: Martin C. Baker, Budd Lake, NJ (US); Clyde R. Taylor, Laurens, SC (US); Thomas M. Hughes, Greer, SC (US); Federico Renteria, Greenville, SC (US); William F. Hehmann, Greer, SC (US)

(73) Assignee: Honeywell International, Morristown, NJ (US)

( * ) Notice: Subject to any disclaimer, the term of this patent is extended or adjusted under 35 U.S.C. 154(b) by 109 days.

(21) Appl. No.: 10/721,632

(22) Filed: Nov. 24, 2003

(65) Prior Publication Data

US 2005/0109744 A1 May 26, 2005

Related U.S. Application Data

(62) Division of application No. 10/071,025, filed on Feb. 8, 2002, now Pat. No. 6,593,540.

(51) Int. Cl.
*B23K 26/00* (2006.01)

(52) U.S. Cl. .......................... 219/121.63; 219/121.84; 219/121.78

(58) Field of Classification Search ........... 219/121.63, 219/121.84, 121.78, 121.65, 121.79
See application file for complete search history.

(56) References Cited

U.S. PATENT DOCUMENTS

| | | | |
|---|---|---|---|
| 3,242,314 A | 3/1966 | Ecides | |
| 3,652,954 A | 3/1972 | Snitzer | |
| 3,696,230 A | 10/1972 | Friedrich | |
| 3,821,510 A * | 6/1974 | Muncheryan | 219/121.79 |
| 3,843,865 A * | 10/1974 | Nath | 219/121.6 |
| 4,436,978 A | 3/1984 | Lemelson | |
| 4,564,736 A * | 1/1986 | Jones et al. | 219/121.6 |
| 4,673,795 A | 6/1987 | Ortiz, Jr. | |
| 4,676,586 A * | 6/1987 | Jones et al. | 385/33 |
| 4,757,515 A | 7/1988 | Hughes | |
| 4,764,655 A * | 8/1988 | Ortiz et al. | 219/121.83 |
| 4,844,574 A * | 7/1989 | Chande | 385/33 |
| 4,906,812 A * | 3/1990 | Nied et al. | 219/121.63 |
| 5,074,861 A | 12/1991 | Schneider et al. | |
| 5,199,870 A | 4/1993 | Steiner et al. | |
| 5,272,716 A * | 12/1993 | Soltz et al. | 372/109 |
| 5,401,171 A | 3/1995 | Paghdiwala | |
| 5,426,278 A | 6/1995 | Hirano et al. | |
| 5,477,025 A * | 12/1995 | Everett et al. | 219/121.84 |
| 5,486,676 A | 1/1996 | Aleshin | |
| 5,993,550 A | 11/1999 | Eloy | |
| 6,060,686 A * | 5/2000 | Jones | 219/121.84 |
| 6,114,651 A | 9/2000 | Schluter et al. | |
| 6,294,754 B1 * | 9/2001 | Nagura et al. | 219/121.63 |
| 6,442,180 B1 | 8/2002 | Gurrieri et al. | |
| 6,593,540 B1 | 7/2003 | Baker et al. | |
| 6,607,524 B1 | 8/2003 | LaBudde et al. | |
| 6,610,053 B1 | 8/2003 | Rizoiu et al. | |

FOREIGN PATENT DOCUMENTS

| | | |
|---|---|---|
| JP | 63-041090 | 2/1988 |
| JP | 11-347774 | 12/1999 |
| WO | PCT/US2004/037289 | 3/2005 |

* cited by examiner

*Primary Examiner*—M. Alexandra Elve
(74) *Attorney, Agent, or Firm*—Ingrassia Fisher & Lorenz (57) ABSTRACT

A hand-held laser welding wand includes internal flow passages through which filler media, gas, and coolant may flow. The wand is dimensioned to be grasped with a single hand, thus filler media of various types and forms, gas, and coolant may be supplied to the hand-held laser welding wand via external systems and delivery devices without substantially impairing operation of the wand.

13 Claims, 5 Drawing Sheets

HAND-HELD LASER WELDING WAND HAVING INTERNAL COOLANT AND GAS DELIVERY CONDUITS

CROSS-REFERENCE TO RELATED APPLICATIONS

This application is related to U.S. patent application Ser. No. 10/460,008, filed Jun. 12, 2003, which is a divisional of U.S. patent application Ser. No. 10/071,025, filed Feb. 8, 2002, which issued as U.S. Pat. No. 6,593,540, on Jul. 15, 2003.

FIELD OF THE INVENTION

The present invention relates to laser welding and, more particularly, to a hand-held laser welding wand that includes internal coolant flow, and gas delivery, conduits.

BACKGROUND OF THE INVENTION

Many components in a jet engine are designed and manufactured to withstand relatively high temperatures. Included among these components are the turbine blades, vanes, and nozzles that make up the turbine engine section of the jet engine. In many instances, various types welding processes are used during the manufacture of the components, and to repair the components following a period of usage. Moreover, various types of welding technologies and techniques may be used to implement these various welding processes. However, one particular type of welding technology that has found increased usage in recent years is laser welding technology.

Laser welding technology uses a high power laser to manufacture parts, components, subassemblies, and assemblies, and to repair or dimensionally restore worn or damaged parts, components, subassemblies, and assemblies. In general, when a laser welding process is employed, laser light of sufficient intensity to form a melt pool is directed onto the surface of a metal work piece, while a filler material, such as powder, wire, or rod, is introduced into the melt pool. Until recently, such laser welding processes have been implemented using laser welding machines. These machines are relatively large, and are configured to run along one or more preprogrammed paths.

Although programmable laser welding machines, such as that described above, are generally reliable, these machines do suffer certain drawbacks. For example, a user may not be able to manipulate the laser light or work piece, as may be needed, during the welding process. This can be problematic for weld processes that involve the repair or manufacture of parts having extensive curvature and/or irregular or random distributed defect areas. Thus, in order to repair or manufacture parts of this type, the Assignee of the present application developed a portable, hand-held laser welding wand. Among other things, this hand-held laser welding wand allows independent and manual manipulation of the laser light, the filler material, and/or the work piece during the welding process. An exemplary embodiment of the hand-held laser welding wand is disclosed in U.S. Pat. No. 6,593,540, which is entitled "Hand Held Powder-Fed Laser Fusion Welding Torch," and the entirety of which is hereby incorporated by reference.

The hand-held laser welding wand, such as the one described above, provides the capability to perform manual 3-D adaptive laser welding on workpieces of differing types, materials, and configurations. Hence, filler media of various types and forms is supplied to the weld area on a workpiece. In addition, many laser welding processes are conducted in the presence of an inert shield gas. Thus, gas may need to be supplied to the hand-held laser welding wand during some welding processes. Moreover, during operation of the hand-held laser welding wand, the wand may heat up. Thus, a way of cooling the wand may be needed. With conventional laser welding devices, external supplies of gas, coolant, and filler media are coupled to the devices via external conduits, tubing, and/or wiring. Such external systems and supply devices can make the use of the hand-held laser welding wand cumbersome, these systems and supply devices can impair an operator, and/or can interfere with the wand operations.

Hence, there is a need for a system of method of supplying filler media to a workpiece, and/or the provision of supplying the various types and forms of filler media via various types of delivery systems and methods, and/or a method of supplying gas and/or coolant to the hand-held laser welding wand that is not cumbersome, and/or does not impair wand operability, and/or does not interfere with wand operations. The present invention addresses one or more of these needs.

SUMMARY OF THE INVENTION

The present invention provides a hand-held laser welding wand that is capable of supplying filler media of various types and forms, and an inert shield gas, to the weld area on a workpiece. The wand additionally allows for supplying coolant to the wand.

In one embodiment, and by way of example only, a hand-held laser fusion welding assembly for treating a workpiece includes a main body and a nozzle. The main body is dimensioned to be grasped by a hand and is adapted to couple to at least a laser delivery system, a gas supply system, and a coolant supply system. The main body includes an internal gas flow passage and one or more coolant flow passages extending therethrough The nozzle is coupled to the main body and has at least an aperture through which laser light from the laser delivery system and gas from the gas supply system may pass.

In another exemplary embodiment, a laser fusion welding system includes a gas supply system configured to supply a flow of gas, a coolant supply system configured to supply a flow of a coolant medium, an optical cable coupled to a laser delivery system and configured to transmit laser light therethrough, and a hand-held laser fusion welding assembly. The assembly includes a main body and a nozzle. The main body is dimensioned to be grasped by a hand and is coupled to the optical cable and includes an internal gas flow passage and one or more coolant flow passages. The gas flow passages extend through the main body and are in fluid communication with the gas supply system. The coolant flow passages extend through the main body and are each in fluid communication with the coolant supply system. The nozzle is coupled to the main body and has at least an aperture in fluid communication with the internal gas flow passage through which laser light transmitted through the optical cable may pass and the flow of gas from the gas supply system may pass.

In another exemplary embodiment, a hand-held laser fusion welding assembly includes a main body and a nozzle. The main body is dimensioned to be grasped by a hand and is adapted to couple to a laser delivery system and to a gas supply system. The main body has an internal gas flow passage extending therethrough. The nozzle is coupled to the main body and has at least an aperture in fluid communication with the internal gas flow passage through which laser light from the laser delivery system and gas from the gas supply system may pass.

In still another exemplary embodiment, a hand-held laser fusion welding assembly includes a main body and a nozzle. The main body is dimensioned to be grasped by a hand and is adapted to couple to a laser delivery system and to a coolant supply system. The main body has one or more coolant flow passages extending therethrough. The nozzle is coupled to the main body and has at least an aperture through which laser light from the laser delivery system may pass.

Other independent features and advantages of the preferred welding wand will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it should be appreciated that the following detailed description is merely exemplary in nature and is not intended to limit the invention or the application and uses of the invention. Furthermore, there is no intention to be bound by any theory presented in the preceding background or the following detailed description.

Figure 1:
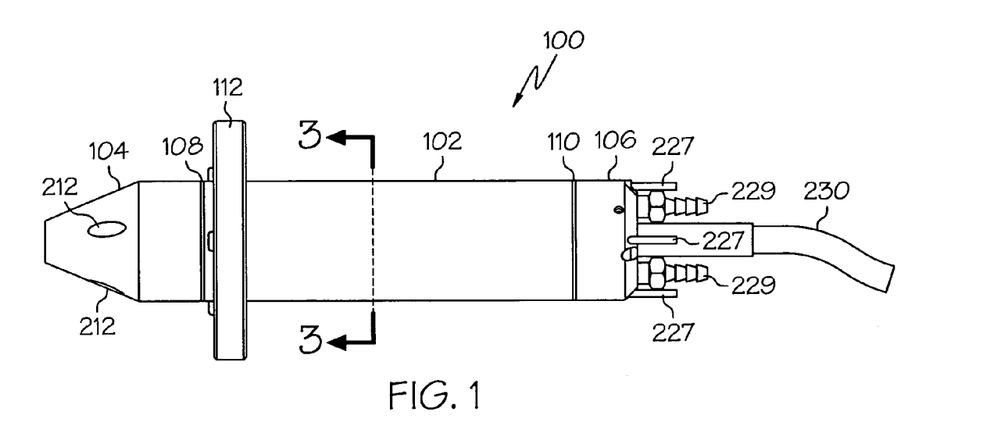
FIG. 1 is a side view of an exemplary hand-held laser welding wand.
Figure 2:
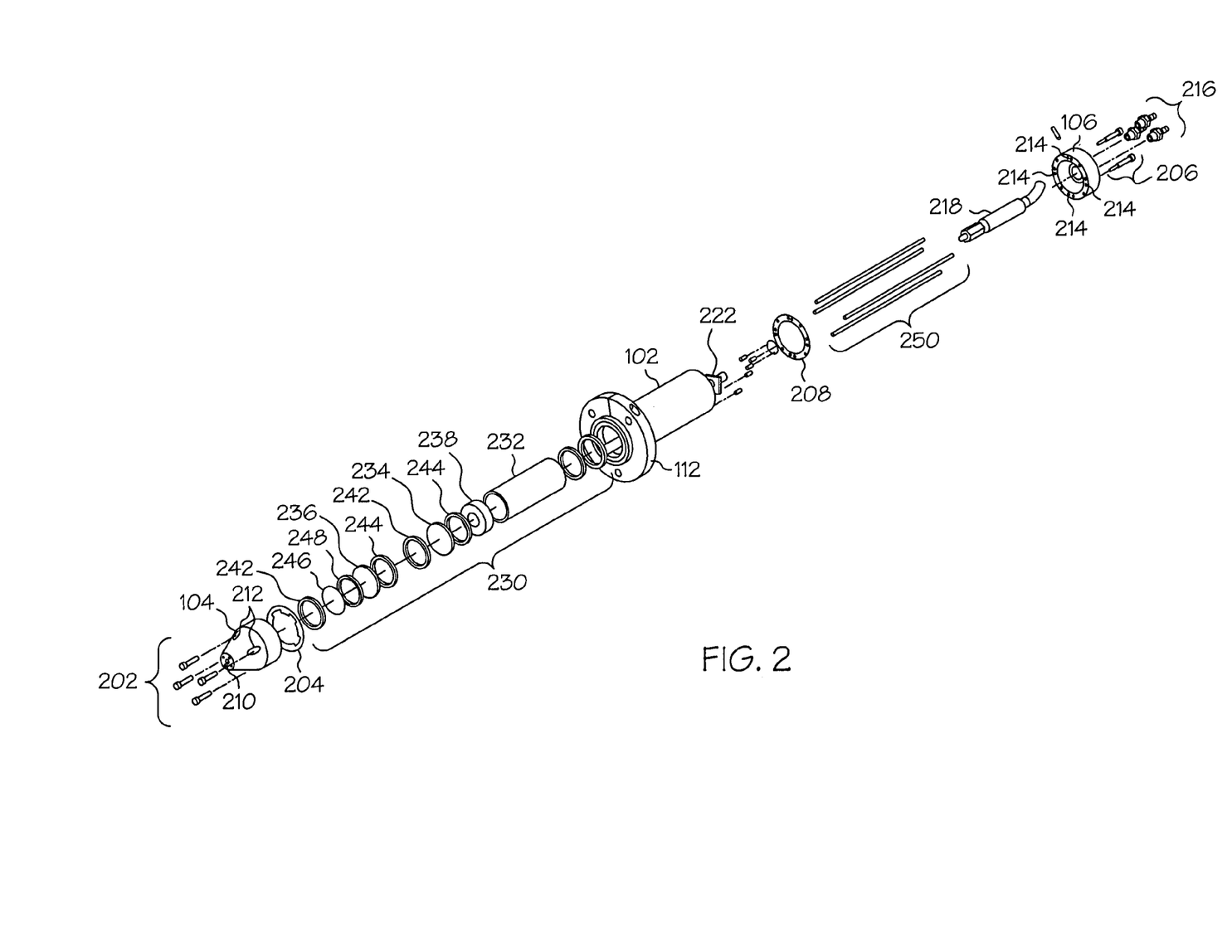
FIG. 2 is a perspective exploded view of the hand-held laser welding wand of FIG. 1.

Turning now to the description, and with reference first to FIGS. 1 and 2, an exemplary hand-held laser welding wand 100 is shown, and includes a main body 102, a nozzle 104, and an end cap 106. The main body 102, which is preferably configured as a hollow tube, includes a first end 108 and a second end 110. The main body first 108 and second 110 ends each include a plurality of threaded openings (not visible). As shown in FIG. 2, the threaded openings in the main body first end 108 each receive a nozzle fastener 202 having mating threads, and which are used to couple the nozzle 104 to the main body first end 108 via a first gasket 204. Similarly, the threaded openings in the main body second end 110 each receive an end cap fastener 206 that has mating threads, and which are used to couple the end cap 106 to the main body second end 110 via a second gasket 208. It will be appreciated that the nozzle 104 and end cap 106 could be coupled to the main body first 108 and second 110 ends, respectively, in a different manner. For example, one or both of the nozzle 104 and end cap 106 could be threaded onto the main body first 108 and second 110 ends, respectively. Moreover, it will be appreciated that the main body 102, and/or the nozzle 104, and/or the end cap 106 could be integrally formed.

A reflection shield 112 may additionally be coupled to the wand 100. The reflection shield 112, if coupled to the wand 100, is used to reflect laser light that may be reflected off a work piece back toward the wand 100. A description of the specific configuration of the reflection shield 112 is not needed, and will thus not be further described in detail.

The main body 102 additionally includes a plurality of orifices and flow passages that extend between the main body first 108 and second ends 110. These orifices and flow passages are used to direct various fluids and other media through the main body 102 and to the nozzle 104. Included among these media are a coolant medium, such as water, an inert gas medium, such as Argon, and a filler material medium, such as powder, wire, or liquid. These orifices and flow passages are in fluid communication with orifices and flow passages in both the nozzle 104 and the end cap 106. The main body orifices and flow passages will now be described. The concomitant filler media orifices and flow passages in the nozzle 104 and end cap 106 will also be described, when these components are separately described further below.

Figure 3:
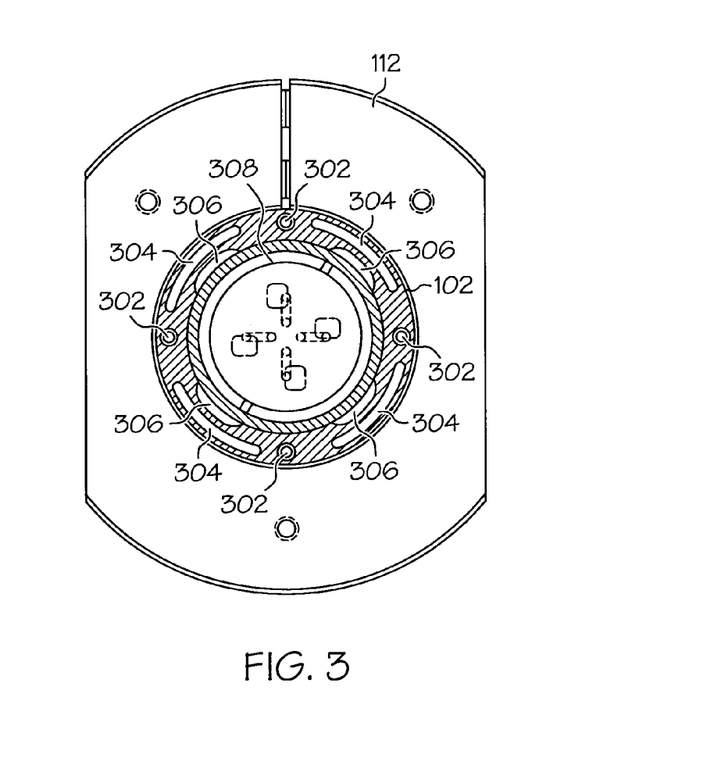
FIG. 3 is a cross section view of the hand-held laser welding wand taken along line 3—3 of FIG. 1.
Figure 4:
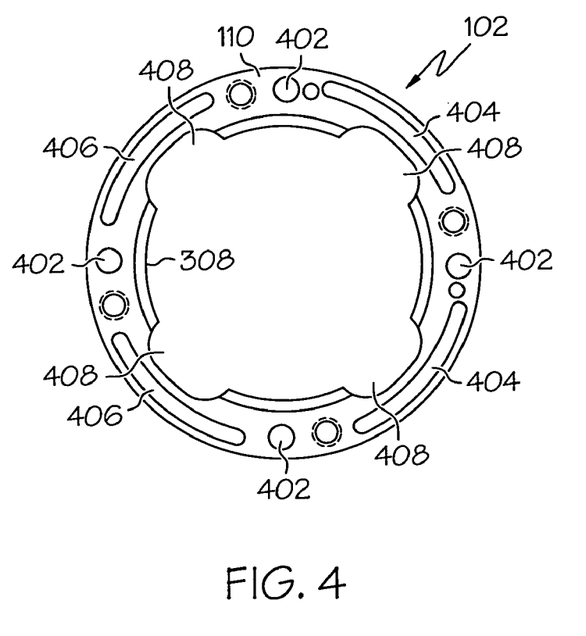
FIGS. 4 and 5 are end views of an exemplary main body portion of the hand-held laser welding wand shown in FIGS. 1 and 2.
Figure 5:
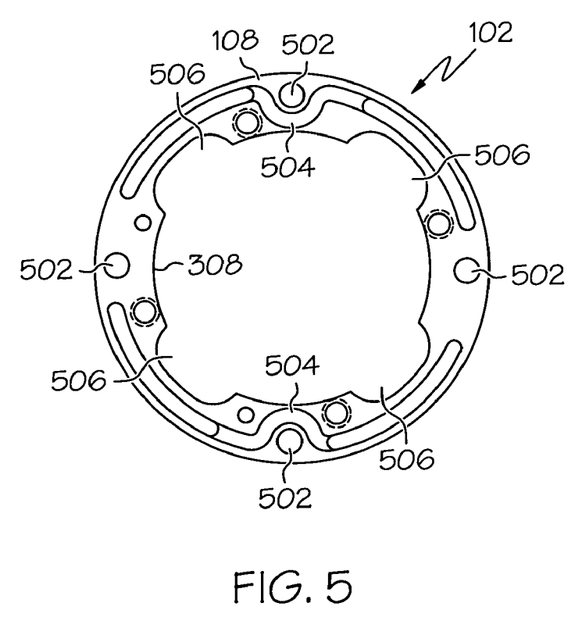

With reference now to FIGS. 3–5, it is seen that the main body 102 includes one or more filler media flow passages 302, one or more coolant flow passages 304, and one or more gas flow passages 306. In the depicted embodiment, the main body 102 includes four filler media flow passages 302, evenly spaced around the main body 102. The filler media flow passages 302, as shown most clearly in FIGS. 4 and 5, each include an inlet port 402 (see FIG. 4) and an outlet port 502 (see FIG. 5). The filler media inlet ports 402 are formed in the main body second end 110, and the filler outlet ports 502 are formed in the main body first end 108. The main body filler media flow passages 302 may be used to supply filler media to a work piece.

The main body 102 additionally includes four coolant flow passages 304, each of which includes an inlet port 404 and an outlet port 406. The coolant inlet 404 and outlet 406 ports are both formed in the main body second end 110. As shown in FIG. 5, two coolant crossover flow passages 504 are formed in the main body first end 108. Thus, coolant supplied to the coolant inlet ports 404 flows through two of the coolant flow passages 304 toward the main body first end 108. When the coolant reaches the main body first end 108, the coolant is directed into and through the coolant crossover flow passages 504, and then into and through the remaining two coolant flow passages 304. The coolant then flows through the remaining two coolant flow passages 304 to the outlet ports 406 formed in the main body second end 110.

The gas flow passages 306, in the depicted embodiment, are formed into an inner surface 308 of the hollow main body 102. It will be appreciated, however, that the gas flow passages 306 could be formed through the main body 102, similar to the filler media 302 and coolant 304 flow passages. The gas flow passages 306, similar to the filler media flow passages 302, each include an inlet port 408 formed in the main body second end 110, and an outlet port 506 formed in the main body first end 108. Thus, gas supplied to the gas flow passage inlet ports 408 flows through the gas flow passages 306, and out the gas flow passage outlet ports 506. The gas exiting the main body gas flow passage outlet ports 506 then flows through the nozzle 104, which will now be described.

Returning once again to FIG. 2, it is seen that the nozzle 104, as was noted above, is coupled to the main body first end 108. The nozzle 104 includes an aperture 210 that extends through the nozzle 104 and is in fluid communication with the inside of the hollow main body 102, and the main body gas flow passage outlet ports 506. As will be described further below, it is through this aperture 210 that laser light and gas pass during laser welding operations. The nozzle 104 additionally includes a plurality of fastener openings 212 that extend through the nozzle 104. A nozzle fastener 202 passes through each of the nozzle fastener openings 212 and into the main body first end 108, as described above, to couple the nozzle 104 to the main body 102.

Figure 6:
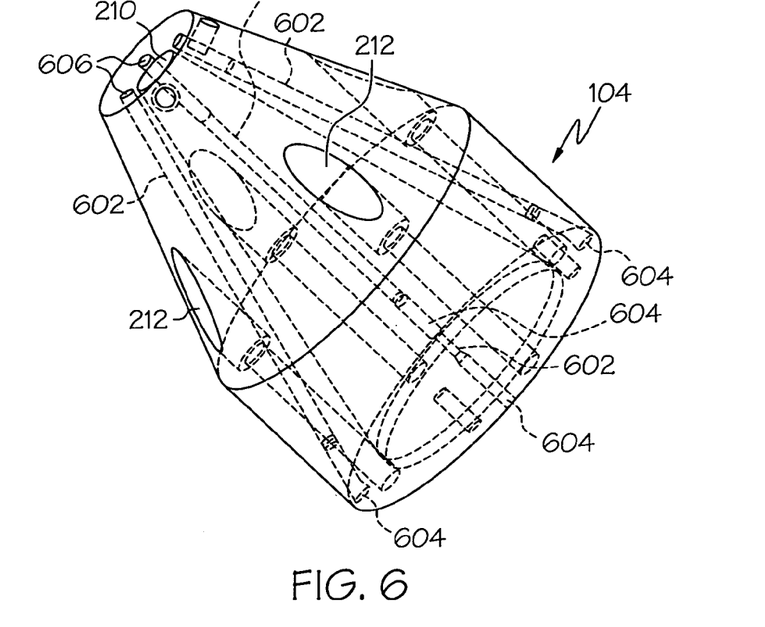
FIG. 6 is a perspective isometric view of an exemplary nozzle that may be used with the hand-held laser welding wand of FIGS. 1 and 2.

As shown more clearly in FIG. 6, the nozzle 104 additionally includes one or more filler media flow passages that, in conjunction with the main body filler media flow passages 302, are used to deliver a filler media to a work piece (not shown). In the depicted embodiment, the nozzle 104 includes four filler media flow passages 602, each in fluid communication with one of the main body filler media flow passages 302. The nozzle filler media flow passages 602, similar to the main body filler media flow passages 302, each include an inlet port 604 and an outlet port 606. When the nozzle 104 is coupled to the main body 102, each of the nozzle filler media flow passage inlet ports 604 is collocated with one of the main body filler media flow passage outlet ports 502. The nozzle filler media outlet ports 606 are preferably evenly spaced around the nozzle aperture 210, and are preferably dimensioned to receive an extension tube (not shown). A detailed description of the structure, function, and configuration of such extension tubes is not needed and, therefore, will not be provided.

Figure 7:
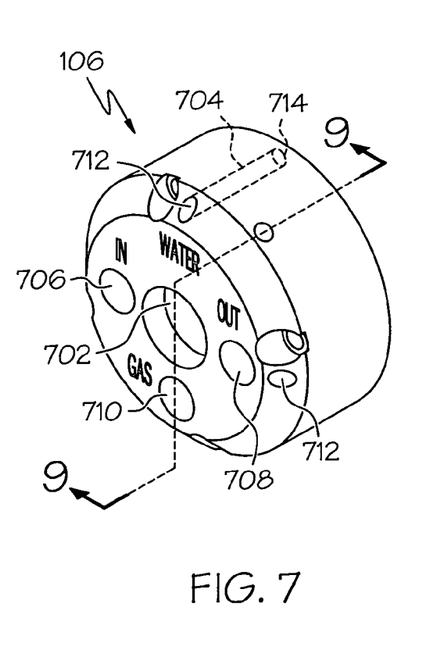
FIGS. 7 and 8 are perspective end views of an exemplary end cap that may be used with the hand-held laser welding wand of FIGS. 1 and 2.

Briefly referring back once again to FIG. 2, in combination with FIGS. 7–10, the end cap 106 will now be described. The end cap 106, as was noted above, is coupled to the main body second end 110 via the plurality of end cap fasteners 206. In particular, the end cap fasteners 206 extend, one each, through a plurality of end cap fastener openings 214 formed through the end cap 106, and into the main body second end 110. As shown in FIG. 7, in addition to the end cap fastener openings 214, the end cap 106 also includes a cable opening 702, a plurality of filler media supply ports 704, two coolant ports 706, 708, and a gas supply port 710. A barbed fitting 216 (see FIG. 2) is preferably coupled to each of the coolant ports 706, 708, and the gas supply port 710. These barbed fittings 216 may be used to couple the ports 706–710 to hoses or other flexible conduits (not shown) that are in fluid communication with a coolant source or a gas source (not shown), as may be appropriate.

Figure 8:
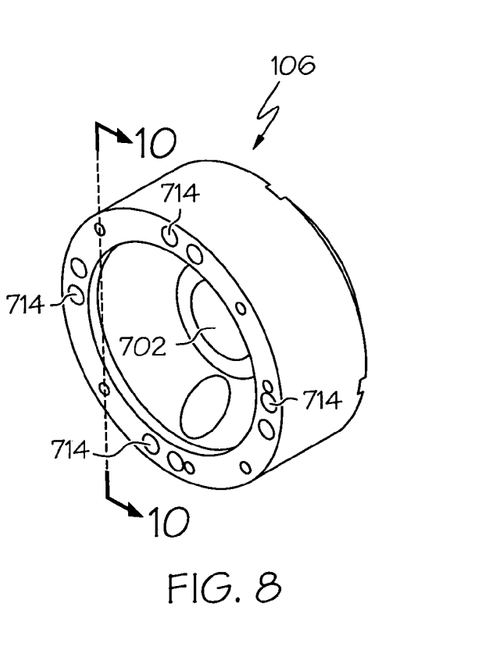
Figure 9:
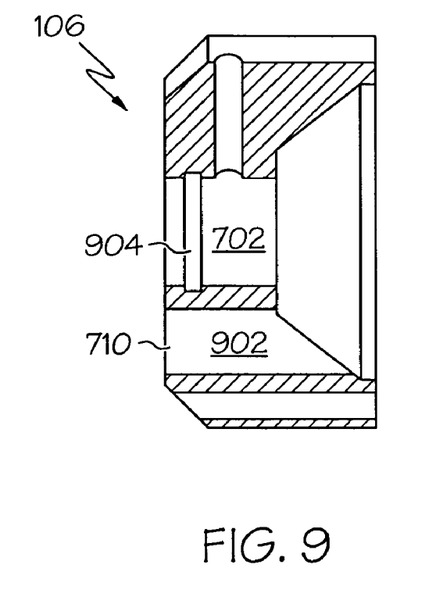
FIGS. 9 and 10 are cross section views of the exemplary end cap take along lines 9—9 and 10—10 of FIGS. 7 and 8, respectively.
Figure 10:
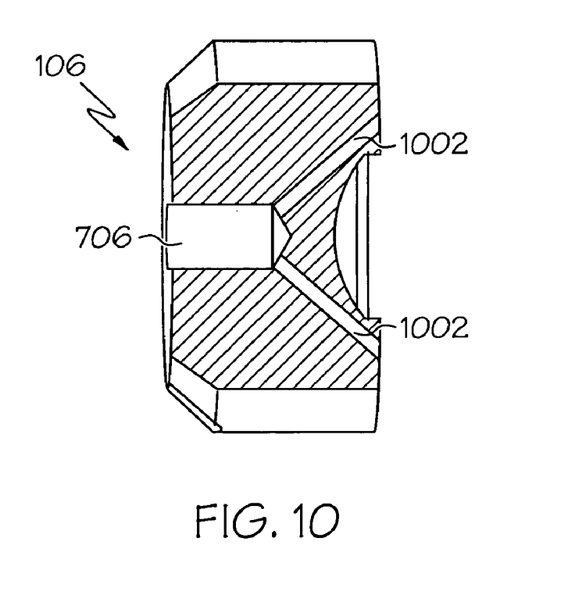

The end cap cable opening 702 is adapted to receive an optical cable and, as shown most clearly in FIGS. 8 and 9, extends through the end cap 106. When the end cap 106 is coupled to the main body 102, the end cap cable opening 702 is in fluid communication with the inside of the hollow main body 102 including, as will be further described below, the main body gas flow passage inlet ports 408. In particular, and with quick reference once again to FIG. 2, an optical cable 218 is inserted into and through the end cap cable opening 702, and is coupled to an optical receptacle 222 mounted within the main body 102. The optical cable 218 is used to transmit laser light from a laser source (not shown) into the main body 102. An optics assembly 230 is mounted within the main body 102 and is used to appropriately collimate and focus the laser light transmitted through the optical cable 218 and receptacle 222, such that the laser light passes through the nozzle aperture 210 and is focused on a point in front of the nozzle aperture 210. As may be seen by referring to FIG. 3, the optics assembly 230 also encloses the main body gas flow passages 306 that are formed on the main body inner surface 308. A brief description of an embodiment of the optics assembly 230 will now be provided. In doing so, reference should be made to FIG. 2.

The optics assembly 230 includes a lens tube 232, a first lens 234, a second lens 236, and an optical adjustment screw 238. The lens tube 232 is preferably constructed of, or coated with, a material that is optically inert. For example, in the depicted embodiment, the lens tube 232 is constructed of black anodized aluminum. The first 234 and second 236 lenses are each mounted within the lens tube 232 via appropriate mounting hardware. In particular, each of the lenses 234, 236 is mounted between first and second retaining rings 242, 244. In addition, a lens cover 246 and lens cover spacer 248 are disposed in front of the second lens 236, providing physical protection for the second lens 236.

With the above described configuration, laser light transmitted through the optical cable 218 and receptacle 222 passes through the first lens 234, which refracts the laser light so that it travels substantially parallel to the interior surface of the lens tube 232. The parallel laser light then passes through the second lens 236, which focuses the laser light to a point in front of the nozzle aperture 210. It will be appreciated that the location of point in front of the nozzle aperture 210 to which the laser light is focused is a function of the focal length of the second lens 236, and its mounting location within the lens tube 232, which is determined by the second lens' retaining rings 242, 244. It will additionally be appreciated that the spacing of the first lens 234 relative to the optical receptacle 222 affects the collimation of the optics assembly 230. Hence, the optical adjustment screw 238, to which the optical receptacle 222 is coupled, is movably mounted within the lens tube 232, and may be used to adjust the spacing between the first lens 234 and the optical receptacle 222. In a particular preferred embodiment, the inner surface of the lens tube 232 and the outer surface of the optical adjustment screw 238 are each threaded to provide this adjustability function.

Returning once again to a description of the end cap 106, and with reference returned to FIGS. 7 and 8, it is seen that, at least in the depicted embodiment, the end cap 106 includes four filler media flow passages 704 (only one shown in phantom in FIG. 7), each of which is in fluid communication with one of the main body filler media flow passages 302. The end cap filler media flow passages 704 each include an inlet port 712 and an outlet port 714. When the end cap 106 is coupled to the main body 102, each end cap filler media outlet port 714 is collocated with one of the main body filler media flow passage inlet ports 402. The end cap filler media inlet ports 712 may be coupled to receive any one of numerous types of filler media including, but not limited to, those delineated above. The particular filler media used may be fed into one or more of the end cap filler media inlet ports 712 either manually, or the filler media may be fed automatically from a filler media feed assembly (not shown).

The filler media supplied to the laser welding wand 100 may flow into and through each of the end cap 704 and main body 302 filler media flow passages via a plurality of tubes. In particular, and with a quick reference once again to FIG. 2, it is seen that a plurality of filler media liner tubes 250 are provided. These filler media liner tubes 250 may be inserted, one each, through one of the end cap filler media flow passages 704, and into the main body filler media flow passages 302. The filler media liner tubes 250 further guide the filler media into and through the end cap 106 and main body 102, and into the nozzle filler media flow passages 602. The filler media liner tubes 250 also protect each of the filler media openings and flow passages against any erosion that could result from filler media flow or movement through the openings and flow passages. Although use of the filler media liner tubes 250 is preferred, it will be appreciated that the wand 100 could be used without the filler media liner tubes 250.

The end cap 106, as was previously noted, also includes two coolant ports. In particular, the end cap 106 includes a coolant inlet port 706 and a coolant outlet port 708. The end cap coolant inlet port 706 is in fluid communication with each of the main body coolant inlet ports 404, via a plurality of coolant inlet flow passages 1002 (see FIG. 10). Similarly, the end cap coolant outlet port 708 is in fluid communication with each of the main body coolant outlet ports 406, via a plurality of coolant outlet flow passages. For clarity, the end cap coolant outlet flow passages are not illustrated. However, it will be appreciated that these flow passages are configured substantially identical to the coolant inlet flow passages 1002. Thus, coolant supplied to the end cap coolant inlet port 706 is directed through the end cap coolant flow passages 1002, and into and through the main body coolant flow passages 304. In the main body 102, the coolant flows as described above. The coolant exiting the main body coolant outlet ports 406 is directed into and through the end cap coolant outlet flow passages, and out the end cap coolant outlet port 708.

The gas supply port 710 directs an inert gas such as, for example, Argon, into the main body gas flow passages 306, via an end cap gas flow passage 902 (see FIG. 9). The end cap gas flow passage 902, in the depicted embodiment, fluidly communicates the end cap gas supply port 710 with the end cap cable opening 702. The end cap cable opening 702, as was noted above, is in fluid communication with the main body gas flow passage inlet ports 408. Thus, gas supplied to the end cap gas supply port 710 is directed through the end cap gas flow passage 902, and into the end cap cable opening 702. A seal, such as a non-illustrated O-ring seal, prevents the gas entering the end cap cable opening 702 from flowing back out the end cap 106. The seal is preferably placed in an O-ring groove 904 formed on an inner surface of the cable opening 702, and through which the optical cable 218 passes. Thus, the gas directed into the end cap cable opening 702 is directed into the main body gas flow passage inlet ports 408, through the main body gas flow passages 306, and into the nozzle 104. The gas is then directed out the nozzle aperture 210.

The hand-held laser welding wand 100 described herein includes a plurality of internal flow passages that allow filler media, gas, and coolant to flow through the wand 100. The flow passages are conveniently connectable to external filler media, gas, and coolant supply sources, which allows the wand 100 to be operated and manipulated with reduced impairment from these external systems, thereby providing improved operability.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A hand-held laser fusion welding assembly, comprising:
   a main body dimensioned to be grasped by a hand and adapted to couple to a laser delivery system, a gas supply system, and a coolant supply system, the main body having an internal gas flow passage and one or more coolant flow passages extending therethrough; and
   a nozzle releasably coupled to a first end of the main body, the nozzle having at least an aperture in fluid communication with the internal gas flow passage through which laser light from the laser delivery system and gas from the gas supply system may pass;
   an end cap releasably coupled to a second end of the main body, the end cap including:
      an optical cable opening adapted to receive an optical cable,
      a gas flow passage in fluid communication with the main body gas flow passage, and
      one or more coolant flow passages each in fluid communication with one of the main body coolant flow passages;
   one or more filler media delivery flow passages extending through the main body;
and
   one or more filler media delivery flow passages extending through the end cap, each end cap filler media delivery flow passage adapted to receive a filler media therein, and each in fluid communication with one of the main body filler media delivery flow passages.

2. The assembly of claim 1, further comprising:
   one or more filler media liner tubes, each liner tube disposed at least partially within one of the end cap filler media delivery flow passages and one of the main body filler media delivery flow passages.

3. The assembly of claim 1, further comprising:
   an optics assembly mounted within the main body and configured to focus the laser light from the laser delivery system on a point in front of the nozzle aperture.

4. The assembly of claim 3, wherein the optics assembly comprises:
   a lens conduit having at least a first end and a second end;
   a first lens mounted within the lens conduit adjacent the lens conduit first end, the first lens configured to collimate the laser light from the laser delivery system; and
   a second lens mounted within the lens conduit adjacent the lens conduit second end, the second lens configured to focus the collimated laser light on the point in front of the nozzle aperture.

5. The assembly of claim 4, wherein at least the first lens is movably mounted within the lens conduit, and wherein the assembly further comprises:
   a receptacle assembly mounted within the main body adjacent the lens conduit first end, the receptacle assembly adapted to receive an optical cable through which the laser light from the laser delivery system is transmitted; and
   an optical adjustment screw movably mounted within the lens conduit adjacent the first lens, the optical adjustment screw configured to adjust a spacing between the first lens and the receptacle assembly, whereby the collimation of the delivered laser light is adjustable.

6. A laser fusion welding system, comprising:
a gas supply system configured to supply a flow of gas;
a coolant supply system configured to supply a flow of a coolant medium;
an optical cable coupled to a laser delivery system and configured to transmit laser light therethrough; and
a hand-held laser fusion welding assembly including:
- a main body dimensioned to be grasped by a hand and coupled to the optical cable, the main body including (i) an internal gas flow passage extending therethrough and in fluid communication with the gas supply system, and (ii) one or more coolant flow passages extending therethrough, each coolant flow passage in fluid communication with the coolant supply system;
- a nozzle releasably coupled to a first end of the main body, the nozzle having at least an aperture in fluid communication with the internal gas flow passage through which laser light transmitted through the optical cable may pass and the flow of gas from the gas supply system may pass;
- an end cap releasably coupled to a second end of the main body, the end cap including:
  - an optical cable opening adapted to receive an optical cable,
  - a gas flow passage in fluid communication with the main body gas flow passage, and
  - one or more coolant flow passages each in fluid communication with one of the main body coolant flow passages;
- one or more filler media delivery flow passages extending through the main body; and
- one or more filler media delivery flow passages extending through the end cap, each end can filler media delivery flow passage adapted to receive a filler media therein, and each in fluid communication with one of the main body filler media delivery flow passages.

7. The system of claim 6, further comprising:
one or more filler media liner tubes, each liner tube disposed at least partially within one of the end cap filler media delivery flow passages and one of the main body filler media delivery flow passages,
wherein the filler media supplied from the filler media delivery system either flows or extends through one or more of the liner tubes.

8. The system of claim 6, wherein the filler media delivery system comprises:
a wire feeder; and
one or more strands of wire filler media coupled to the wire feeder.

9. The system of claim 6, wherein the filler media delivery system comprises:
a container having an inner volume;
powder filler media disposed within the container inner volume; and
one or more conduits, each conduit in fluid communication with the container inner volume and a main body filler media delivery flow passage.

10. The system of claim 6, wherein the filler media delivery system comprises:
a container having an inner volume;
liquid filler media disposed within the container inner volume; and
one or more conduits, each conduit in fluid communication with the container inner volume and a main body filler media delivery flow passage.

11. The system of claim 6, further comprising:
an optics assembly mounted within the main body and configured to focus the laser light from the laser delivery system on a point in front of the nozzle aperture.

12. The system of claim 11, wherein the optics assembly comprises:
a lens conduit having at least a first end and a second end;
a first lens mounted within the lens conduit adjacent the lens conduit first end, the first lens configured to collimate the laser light from the laser delivery system; and
a second lens mounted within the lens conduit adjacent the lens conduit second end, the second lens configured to focus the collimated laser light on the point in front of the nozzle aperture.

13. The system of claim 12, wherein at least the first lens is movably mounted within the lens conduit, and wherein the system further comprises:
an optical cable trough which the laser light from the laser delivery system is transmitted;
a receptacle assembly mounted within the main body adjacent the lens conduit first end, the receptacle assembly coupled to the optical cable; and
an optical adjustment screw movably mounted within the lens conduit adjacent the first lens, the optical adjustment screw configured to adjust a spacing between the first lens and the receptacle assembly, whereby the collimation of the delivered laser light is adjustable.

* * * * *

UNITED STATES PATENT AND TRADEMARK OFFICE
CERTIFICATE OF CORRECTION

PATENT NO. : 7,012,216 B2  Page 1 of 1
APPLICATION NO. : 10/721632
DATED : March 14, 2006
INVENTOR(S) : Baker et al.

It is certified that error appears in the above-identified patent and that said Letters Patent is hereby corrected as shown below:

Claim 1
Column 8, line 12, delete the word "and" following the word "therethrough";
Claim 6, Column 9, line 36, "can" should be changed to --cap--.

Signed and Sealed this

Third Day of April, 2007

JON W. DUDAS
*Director of the United States Patent and Trademark Office*